P. TORCHIO & H. R. WOODROW.
PROTECTIVE DEVICE FOR BUS BAR CIRCUITS.
APPLICATION FILED OCT. 28, 1914.
1,149,603.
Patented Aug. 10, 1915.
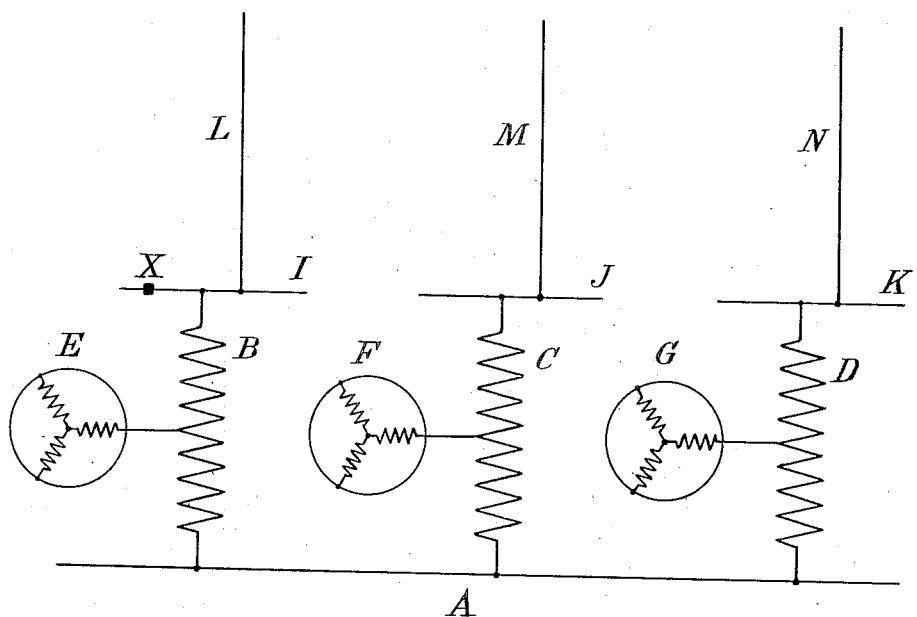

UNITED STATES PATENT OFFICE.

PHILIP TORCHIO AND HARRY R. WOODROW, OF NEW YORK, N. Y., ASSIGNORS TO THOMAS E. MURRAY, OF NEW YORK, N. Y.

PROTECTIVE DEVICE FOR BUS-BAR CIRCUITS.

1,149,603.  Specification of Letters Patent.  Patented Aug. 10, 1915.

Application filed October 28, 1914. Serial No. 868,960.

*To all whom it may concern:*

Be it known that we, PHILIP TORCHIO and HARRY R. WOODROW, citizens of the United States, residing at New York, in the county of New York and State of New York, have invented a certain new and useful Improvement in Protective Devices for Bus-Bar Circuits, of which the following is a specification.

The invention is a protective device for busbar circuits.

In our Patent No. 1,133,338, March 30, 1915, we have described a busbar circuit sectionalized by a system of reactance coils, in series circuit, and a correlated system of alternating current generators or group of generators, one for each reactance coil, the terminal leads of said generators or group of generators being connected to taps on their respective reactance coils. By this system of connections we obtained the result of maintaining at full generation of voltage, in case of a short circuit on the system, all the busbar sections except the section affected by the short circuit.

Our present invention is an improvement of the aforesaid invention and provides in combination with an unsectionalized main busbar, a system of multiple connections consisting of reactance coils each having one terminal connected to the main busbar and the other terminal connected to an independent distributing bus and each reactance coil having a generator, or group of generators, connected to a tap on said reactance coil.

The accompanying drawing is an electrical diagram symbolically illustrating our invention.

A is the main busbar circuit to which are connected in multiple reactance coils B, C, D. Alternating current alternators E, F, G are connected to said reactance coils at taps between the coil terminals.

I, J, K are independent distributing buses.

L, M, N are branch leads or feeders connected to distributing buses I, J, K. Under normal conditions each of the generators E, F, G is regulated to generate an equal share of the total output of the feeders L, M, N. If, for instance, each of the feeders L, M, N carries an exactly equal load, then generator E will supply the current for feeder L, generator F will supply feeder M and generator G will supply feeder N and no substantial amount of current will flow between the generator of one section of distributing buses and the distributing buses of other generators except the synchronizing current required to maintain the parallel operation of the generators. If, however, some of the distributing buses L, M, N require more current than others, then the generators on the less loaded sections of distributing buses will furnish the surplus current, generated in excess of the requirements of their correlated distributing buses to the more heavily loaded section of distributing buses. This transfer of current will take place through the main bus A, and the reactance coils B, C, D. In such case the current of a generator like E may divide itself in its reactance coil B, one portion going to the distributing bus I and the other portion to the bus A, and hence to the more heavily loaded section of, say, bus J, by way of the reactance coil C. To force this last-named portion of current through the reactances intervening between the terminal of generator E and J, the voltage of generator E must increase by the corresponding amount of voltage lost in these reactances. This voltage would be too high for maintaining the proper voltage regulation on bus I were it not for the influence of the mutual inductance of the two portions of the reactance coil B carrying currents in opposite directions. The current which flows from the terminal of generator E to bus A will induce in the section of reactance B, between generator terminal and I, a counter-electromotive force proportional to the amount which the voltage of generator E has been increased. In this manner the voltage of the distributing buses I, J, K are kept all at practically the same potential regardless of the amount of current which any one carries.

Consider the case in which one of the distributing buses I, J, K, or correlated feeders L, M, N may be short-circuited. Let us assume that the short-circuit is at X on bus I. Generator E becomes short-circuited through the portion of reactance coil B between its terminal and I, and generators F and G through the reactances between their respective terminals and main bus A in series with reactance B. The greater impedance to the flow of current offered by the latter reactances tends to throw more of the short-circuit current on generator E. This current flowing through the portion of reactance coil B between the terminal of generator E and I induces by mutual induction in the reactance between the terminal of generator E and main bus A a counter electro-motive force proportional to the drop in the former portion, thereby maintaining the voltage on bus A and the rest of the undamaged system at practically its normal value, without being affected by the short circuit X on bus I.

We claim:

In combination with a main bus, a plurality of reactance coils connected at one end to the main bus, a plurality of independent distributing buses one each connected to the remaining terminals of the reactance coils, and a generator or group of generators, connected to a tap on each of said reactance coils.

In testimony whereof we have affixed our signatures in presence of two witnesses.

PHILIP TORCHIO.
HARRY R. WOODROW.

Witnesses:
GERTRUDE T. PORTER,
MAY T. McGARRY.